US006828988B2

(12) United States Patent
Hudson et al.

(10) Patent No.: US 6,828,988 B2
(45) Date of Patent: Dec. 7, 2004

(54) INTERACTIVE TOOLTIP

(75) Inventors: Margaret G. Hudson, North Bend, WA (US); Tuan Huynh, Seattle, WA (US); Kent R Lowry, Seattle, WA (US); Justin M. Maguire, III, Seattle, WA (US); Eric W. Patterson, Issaquah, WA (US); Marcella Rader, Bellevue, WA (US); Mariya Tikunova, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 568 days.

(21) Appl. No.: 09/794,691

(22) Filed: Feb. 27, 2001

(65) Prior Publication Data

US 2002/0118221 A1 Aug. 29, 2002

(51) Int. Cl.[7] .................................................. G06F 3/14
(52) U.S. Cl. ........................ 345/711; 345/715; 345/714
(58) Field of Search ................................. 345/705–715, 345/856, 857, 858, 859, 860, 861, 862

(56) References Cited

U.S. PATENT DOCUMENTS

| | | | | | |
|---|---|---|---|---|---|
| 5,603,021 A | * | 2/1997 | Spencer et al. | ................. | 707/4 |
| 5,893,125 A | * | 4/1999 | Shostak | ...................... | 715/511 |
| 5,995,101 A | * | 11/1999 | Clark et al. | .................. | 345/711 |
| 6,020,886 A | * | 2/2000 | Jacober et al. | .............. | 345/709 |
| 6,057,837 A | * | 5/2000 | Hatakeda et al. | ........... | 345/765 |
| 6,584,479 B2 | * | 6/2003 | Chang et al. | ................ | 715/512 |

OTHER PUBLICATIONS

*An adaptive environment for the user interface of Excel*; Christopher G. Thomas and Mette Krogsaeter; *Proceedings of the International Workshop on Intelligent user interfaces*, 1993, pp. 123–130.
*Help design challenges in network computing*; Ben Gelernter; *Proceedings of the sixteenth annual international conference on computer documentation*, 1998, pp. 184–193.
*Graphical techniques in a spreadsheet for specifying user interfaces*; Brad A. Myers; *Human factors in computing systems conference proceedings on reaching through technology*, 1991, pp. 243–249.

* cited by examiner

*Primary Examiner*—Raymond J. Bayerl
*Assistant Examiner*—Tadesse Hailu
(74) *Attorney, Agent, or Firm*—Merchant & Gould

(57) ABSTRACT

An interactive tooltip provides access to help information and enhanced editing capabilities. The interactive tooltip is especially useful for a user editing a function within a spreadsheet formula. The present invention integrates HTML-like interactivity with a conventional tooltip to provide a new interface for working with the associated data. The interactivity of the tooltip provides additional levels of help or documentation when requested and provides additional editing navigation functionality within the associated data. The present invention provides a tooltip in close proximity to the associated data, while the associated data is being edited. In the case of a spreadsheet, a tooltip will be provided when the user begins editing a function within a spreadsheet cell. The help facility of the present invention recognizes that the user has begun entering a function, when the user has entered an equals sign (identifying a formula), a known function name, and a parenthesis (indicating the beginning of an argument set). The help facility then references a function database and determines the required argument set. The help facility renders the function name and argument set in an HTML-like text, and provides an alternate method for selecting any argument. Finally, the help facility displays the HTML-like text to the user next to the point at which the user is editing the spreadsheet function.

11 Claims, 10 Drawing Sheets

INTERACTIVE TOOLTIP

FIELD OF THE INVENTION

The present invention generally relates to providing help information to computer users. More particularly, the present invention relates to an interactive tooltip capable of providing help and editing functions to a user.

BACKGROUND OF THE INVENTION

Spreadsheets like Microsoft Excel (manufactured and marketed by the Microsoft Corporation of Redmond, Wash.) typically have hundreds of spreadsheet functions for performing various, predefined operations on data. Each worksheet function typically has one or more arguments. Spreadsheet usability studies indicate that it is difficult for users to memorize every function's argument set. Even for functions that are used frequently, it is difficult for users to remember the type and order of the required arguments.

Currently, users resort to accessing existing help facilities to determine information about argument names and proper argument order, consuming the user's time and effort. For example, if a user wishes to invoke a particular function, but does not remember the arguments required to properly invoke the function, the user must refer to a help facility to find this information. In this case, the user may stop editing the formula in the spreadsheet application and open a help facility to determine the appropriate argument set. The user may then write down the argument set and then switch back to the spreadsheet application to enter the formula, referring to his written note. This process can become very tedious when a user's spreadsheet invokes a large number of functions.

Another approach to providing a user with information about argument names and proper argument order involves the use of a function "wizard." The conventional function wizard provides a series of dialog boxes that step a user through the selection of a function and through the matching of the applicable arguments to spreadsheet cells. Unfortunately, this process can also be tedious, because it involves working in a wizard dialog box separate from the spreadsheet itself.

Therefore, there is a need in the art for a help facility to provide information about a function in close proximity to the function being entered or edited, such that a user need not switch away from making edits within the spreadsheet application to obtain help information. The help facility should provide the function's argument set and the proper argument ordering within the set. The help facility should also operate to enable the display of more comprehensive help information regarding the function, should additional information be requested by the user. Finally, the help facility should enhance the user's ability to create, select, and edit arguments within a function.

SUMMARY OF THE INVENTION

The present invention meets the above-described needs by providing an interactive tooltip for a user editing a function within a spreadsheet formula. Although tooltips are not new, the present invention integrates HTML-like interactivity with a conventional tooltip to provide a new interface for working with the associated data. The interactivity of the tooltip provides additional levels of help or documentation when requested and provides additional editing navigation functionality within the associated data. Additionally, unlike conventional tooltips that are displayed in response to a determination that the mouse cursor is positioned over an element of the user interface, the interactive tooltip of the present invention is displayed in response to a determination that the user is performing a particular type of editing action.

The present invention provides a tooltip in close proximity to the associated data, while the associated data is being edited. In the case of a spreadsheet, a tooltip will be provided when tie user begins editing a function within a spreadsheet cell. The help facility of the present invention recognizes that the user has begun entering a function, when the user has entered an equals sign (identifying a formula), a known function name, and an open (left) parenthesis (indicating the beginning of an argument set). The help facility then references a function database and determines the required argument set. The help facility renders the function name and argument set in an HTML-like text. Finally, the help facility displays the HTML-like text to the user next to the point at which the user is editing the spreadsheet function.

One aspect of the invention is a method for providing an interactive tooltip. The method includes receiving an indication that a function is being entered in an editing location and recognizing an entered function name. Tooltip information associated with the recognized function name is retrieved and the tooltip information is displayed in a display location proximate to the editing location. The tooltip information includes a function name and an argument name, the function name provides a link to a function name help topic, while the argument name provides a selection tool to select a portion of the editing location corresponding to the argument name.

In another aspect of the invention, an interactive tooltip is provided. The interactive tooltip is associated with data and includes a first text string and a second text string. The first text string provides a link to help information corresponding to the associated data. The second text string operates as a selection tool for selecting a portion of the associated data. The first text string and the second text string are displayed in proximity to the associated data.

In yet another aspect of the present invention, a spreadsheet help facility is provided as a component of a computer system having a graphical user interface including a display and a user interface selection device. The spreadsheet help facility has a function database, a recognizer component, and two rendering components. The function database stores a function name text string, an argument name text string associated with the function name text string, a first link associated with the function name text string, and a second link associated with the function name text string. The recognizer component recognizes the entry of the function name and retrieves the function name, the argument name, the first link, and the second link from the function database. The first rendering component matches the function name text string to the first link and matches the argument name text string to a second link. The second rendering component for displays a tooltip including the function text string and the argument text string. By selecting the function text string with the user interface selection device, a help topic identified by the first link is displayed. By selecting the argument text string with the user interface selection device, a portion of the entered function name is selected.

DETAILED DESCRIPTION

An exemplary embodiment of the present invention provides an interactive tooltip for a user editing any type of data. An exemplary embodiment of the present invention integrates Hypertext Markup Language-like (HTML) interactivity with a conventional tooltip to provide a new interface for working with the associated data (e.g., spreadsheet functions). The interactivity of the tooltip provides additional levels of help or documentation when requested and provides additional editing navigation functionality within the associated data.

In one embodiment of the present invention a tooltip is provided in close proximity to the associated data, while the associated data is being edited. For example, in the case of editing a spreadsheet function, a tooltip will be provided when the user begins editing the function within a spreadsheet cell. The help facility of an exemplary embodiment of the present invention recognizes that the user has begun entering a function, when the user has entered an equals sign (identifying a formula), a known function name, and a parenthesis (indicating the beginning of an argument set). The exemplary help facility then references a function database and determines the required argument set. The help facility renders the function name and argument set in an HTML-like text. Finally, the help facility displays the HTML-like text to the user next to the point at which the user is editing the spreadsheet function.

The HTML-like representation provides the tooltip text with functionality. The text representing the function name can be rendered as a link that allows the user to access more comprehensive help information relating to the particular function. The text representing the arguments in the argument set can be selectively boldfaced to identify the function argument that is currently being edited by the user. The user can also select the argument text in the tooltip to select the portion of the associated data in the spreadsheet cell for editing purposes. For example, if a user would like to edit the fourth argument of a particular function in a formula, the user can select the tooltip's representation of that fourth argument to select the argument in the cell. When an argument has been selected in this manner, the user can replace the text of that argument by typing or pasting new text into the cell (or in any other formula editing tool, such as a formula bar).

Notably, although the help facility of the present invention is primarily described as providing interactive tooltips for editing spreadsheet functions, the inventors contemplate that the interactive tooltip could be utilized in various contexts. For example, virtually any document editing application (e.g., a word processor) could provide interactive tooltips in association with virtually any data.

Figure 1:
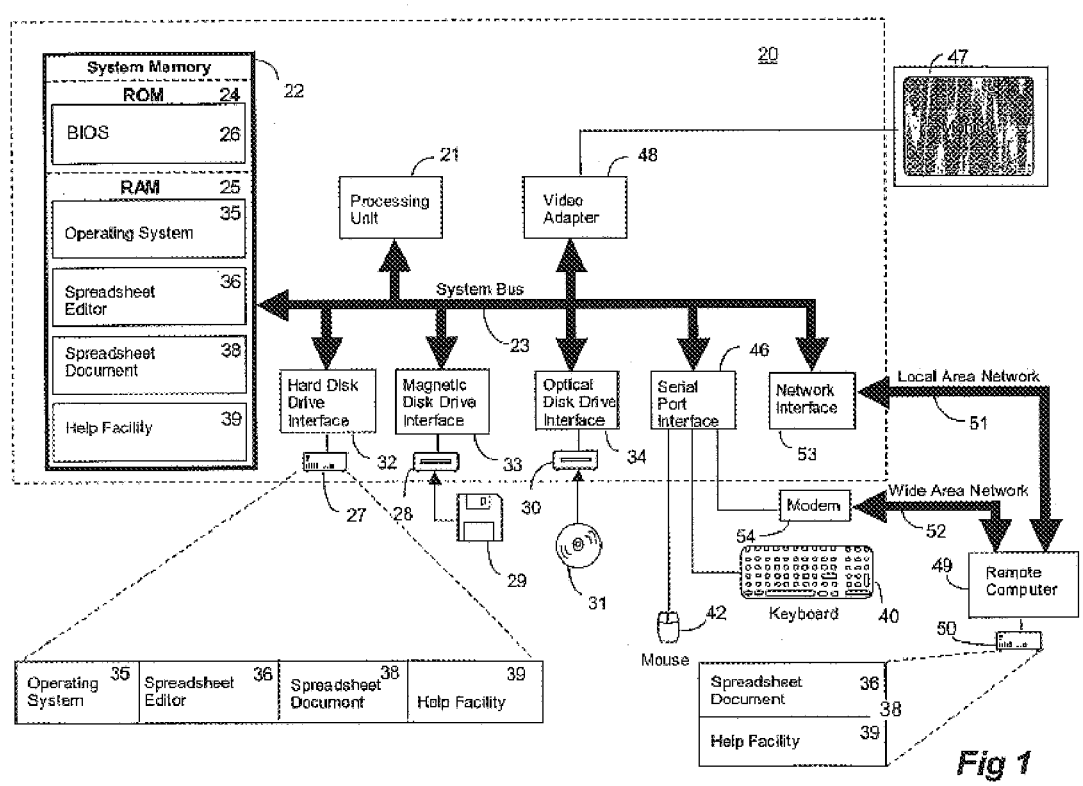
FIG. 1 is a block diagram illustrating an exemplary operating environment for implementing of the present invention.

Exemplary embodiments of the present invention will hereinafter be described with reference to the drawing, in which like numerals represent like elements throughout the several figures. FIG. 1 illustrates an exemplary operating environment for implementation of the present invention. The exemplary operating environment includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that helps to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20. For example, one or moredata files 60 may be stored in the RAM 25 and/or hard drive 27 of the personal computer 20.

A number of program modules may be stored on hard disk 27, magnetic disk 29, optical disk 31, ROM 24, or RAM 25, including an operating system 35, a spreadsheet editor 36, a spreadsheet document 38, and a help facility 39. Program modules include routines, sub-routines, programs, objects, components, data structures, etc., which perform particular tasks or implement particular abstract data types. Aspects of the present invention may be implemented in the form of a help facility program module 39 that can be incorporated into or otherwise in communication with a spreadsheet editor program module 36. The spreadsheet editor program module 36 generally comprises computer-executable instructions for creating or modifying an electronic spreadsheet document. The help facility program module 39 generally comprises computer-executable instructions for providing help information in various contexts. The help facility 39 is generally accessible to the spreadsheet editor program module 36, but can also be implemented as an integral part of the spreadsheet editor program module.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A display device 47 may also be connected to system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to the personal computer 20, only a memory storage device 50 has been illustrated in the figure. The logical connections depicted in the figure include a local area network (LAN) 51 and a wide area network (WAN) 52. Such networking environments are commonplace in offices, enterprise-wide computer networks, intranets, and the Internet.

When used in a LAN networking environment, the personal computer 20 is often connected to the local area network 51 through a network interface or adapter 53. When used in a WAN networking environment, the personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
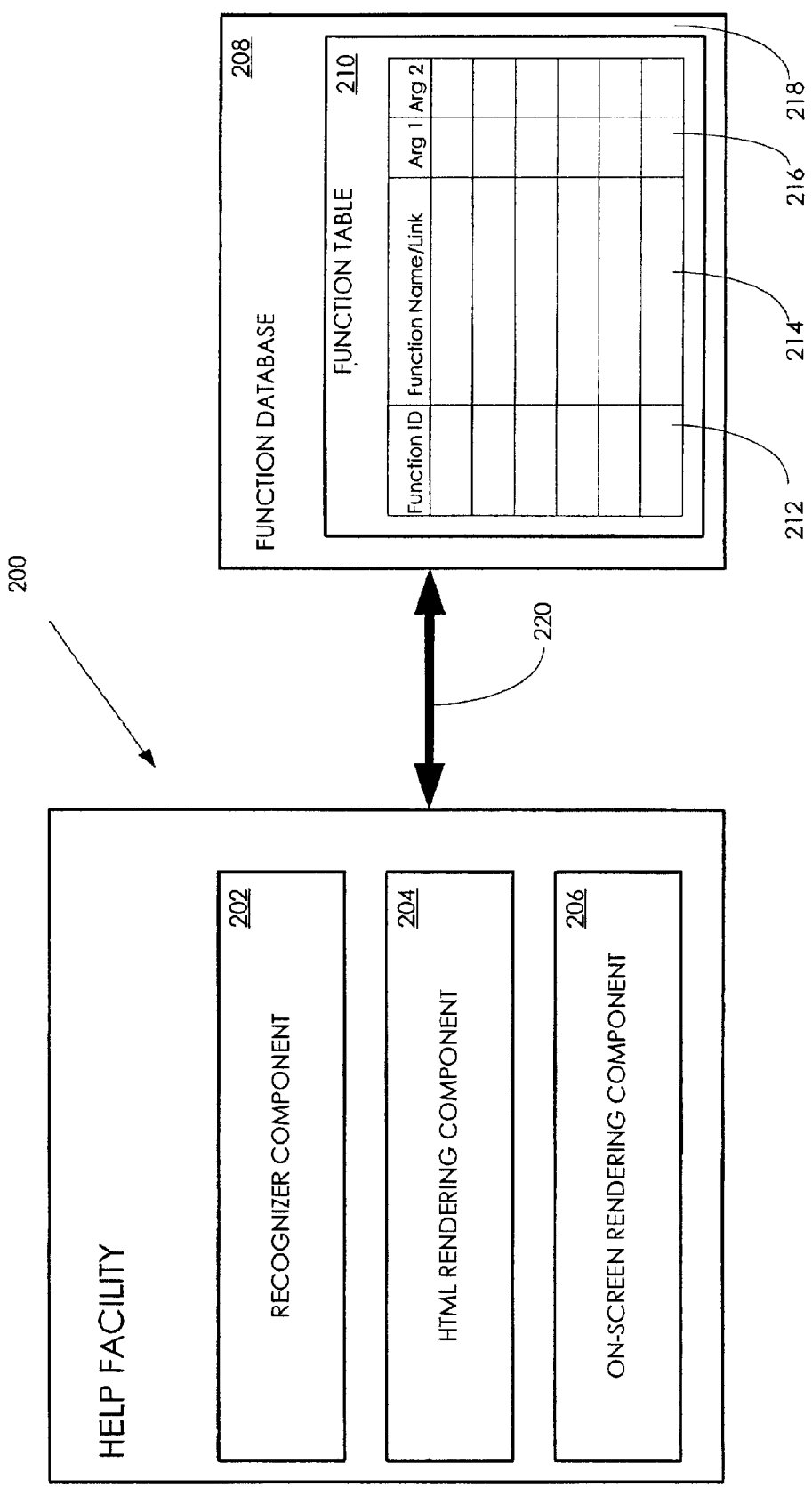
FIG. 2 is a block diagram illustrating some of the primary components of an exemplary embodiment of the present invention.

FIG. 2 is a block diagram illustrating some of the primary components of an exemplary embodiment of the present invention. An exemplary help facility 200 has three components, a recognizer component 202, a Hypertext Markup Language (HTML) rendering component 204, and an on-screen rendering component 206. The help facility 200 can also include a function database 208. Although the function database 208 can be implemented as an integral part of the help facility 200, the function database 208 is depicted in FIG. 2 as a separate component with which the help facility 200 communicates over a communication channel 220. The function database has a function table 210 that includes a list of valid spreadsheet functions. The spreadsheet functions are organized by function identification numbers 212, function names 214 and the arguments pertaining to each function 216, 218. The function table 210 of FIG. 2 depicts two argument records for each function. However, any number of arguments could be associated with each function in the function table 210.

The help facility 200 may be used to parse spreadsheet functions, and to provide help information pertaining to the function. In an exemplary embodiment of the present invention, the help facility 200 is used to provide an interactive tooltip in proximity to an editing location of a formula including a valid function. When a spreadsheet user begins entering a function, the recognizer component 202 analyzes the user's keystrokes that are entered into either a spreadsheet cell or another editing location such as a formula bar. When the recognizer component 202 recognizes the entry of a valid spreadsheet function, it can trigger the display of an interactive tooltip corresponding to the spreadsheet function.

The recognizer component 202 accesses the function database 208 over the communication channel 220 to compare the entered function with the function name fields 214 of the function table 210. When the recognizer component 202 recognizes a match between the entered function and one or more function names 214, the recognizer component triggers the on-screen representation of the interactive tooltip. Those skilled in the art will appreciate that while the list of function names 214 can be pre-defined, the list may also be configurable, so that custom functions can be created, added, or deleted from the list.

In an alternative embodiment, the recognizer component 202 may trigger the display of an interactive tooltip for an entered function that does not match any function names 214, but is very similar to one or more function name 214. In this alternative embodiment, the tooltip could be displayed for one or more function names that are similar to the entered function name. The proper function could then be chosen from the displayed tooltip. In response to the choice of the proper function, the entered function could be modified to match the chosen function.

The help facility 200 also includes an HTML rendering component 204 that assembles the interactive and visual components of the interactive tooltip. The HTML rendering component 204 can access the function table 210 within the function database 208 to obtain the HTML components corresponding to the function recognized by the recognizer component 202. Either the recognizer component 202 or the HTML rendering component 204 can first retrieve the function name for the recognized function. The HTML rendering component 204 can then associate the function name with a link to an external help topic. The link can either be stored as a portion of the function name 214 or can be stored in a separate field in the function table. Those skilled in the art will appreciate that while the help topic has been described as being an external entity, the help topic could be stored internally as, for example, another field in the function table 210.

Once the HTML rendering component 204 has assembled the function name and the link, the HTML rendering component can retrieve the text representing the arguments required by the recognized function. As described above, the text is stored in the argument fields 216, 218.

The help facility 200 can also include an on-screen rendering component 206. The on-screen rendering component 206 can function to display the HTML components of the interactive toolbar on the display. Thus, the function name and all corresponding argument names (argument text), are compiled to create a single tooltip. As is discussed below in connection with FIGS. 3–10, an exemplary interactive tooltip can display the function name and arguments in a format required by the spreadsheet application. Typically, this will consist of the function name followed by a parenthetical list of arguments. The interactive tooltip is said to be interactive, because the displayed function name also operates as a link enabling the display of a help topic associated with the function name in response to a user clicking on the function name/link. Additionally, the argument names in the displayed interactive tooltip enable editing navigation. When the user clicks on one of the argument names, the corresponding portion of the entered formula (i.e., the corresponding argument in the entered formula) will be selected. Selecting a group of text is the conventional means for changing the format of the text or deleting the text in response to the entry of replacement text.

In an alternative embodiment, the argument names may also be used as a link to display of a help topic associated with the argument name in response to a user clicking on the argument name/linkin the interactive tooltip.

It will be appreciated by those of ordinary skill in the art that the components depicted in FIG. 2 can be implemented as separate components or can be implemented as an internal component of a spreadsheet application program. Moreover, while an exemplary embodiment of the present invention utilizes a help facility 200 with three components 202 through 206, the invention can be implemented with any number of components performing the functions described above.

Figure 3:
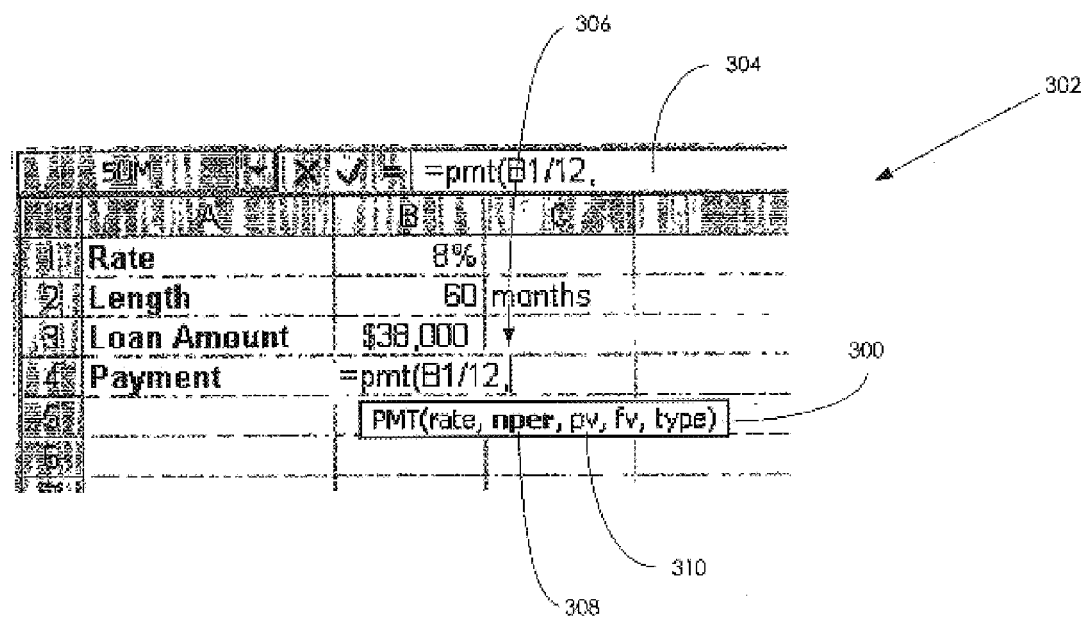
FIG. 3 depicts an exemplary interactive tooltip displayed in connection with editing a formula in a cell of an exemplary spreadsheet application program user interface.

FIG. 3 depicts an exemplary interactive tooltip 300 displayed in the context of an exemplary spreadsheet application program user interface 302. In the example of FIG. 3, the interactive tooltip 300 corresponds to a function that is being entered in cell B4. The entered function is the "PMT" function for calculating a payment based on arguments including an interest rate, a number of payment periods, a present value, a future value, and a loan type. The formula is being entered directly into the cell (cell B4), as opposed to the formula bar 304. Accordingly, the interactive tooltip 300 is displayed in close proximity to cell B4 and not the formula bar 304.

The entered formula includes an equals sign, followed by the function name and an open parenthesis. In an exemplary spreadsheet the equals sign indicates that a function follows. Additionally, an open parenthesis indicates the beginning of the arguments corresponding to the function. In this case, the first argument is "B1/12" (i.e., the value in the cell B1 divided by 12). The first argument is followed by a comma and the cursor 306 is located at the insertion point for the second argument. The argument name corresponding to the second argument is "nper". The second argument text 308 in the interactive tooltip 300 is depicted in boldface to indicate that the second argument is being entered (or can be entered). Once the second argument has been entered and a comma has been entered to follow the second argument, the third argument name 310 ("pv") will be highlighted. Thus, the interactive tooltip 300 assists the user by identifying the argument that is currently being entered. As described above, the user can click on (i.e., select) any of the argument names in the interactive tooltip corresponding to an entered argument to select that entered argument in the editing location.

Figure 4:
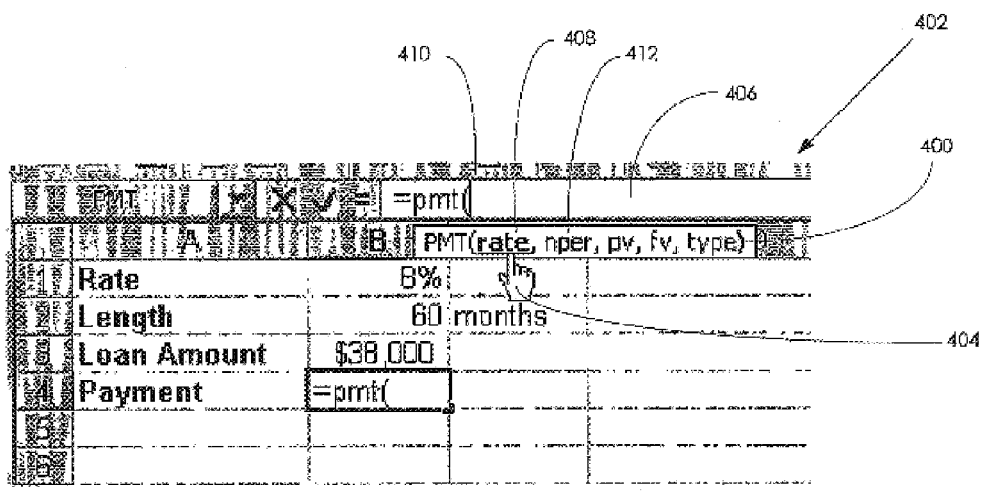
FIG. 4 depicts an exemplary interactive tooltip displayed in connection with editing a formula in a formula bar of an exemplary spreadsheet application program user interface.

FIG. 4 depicts an interactive tooltip 400 displayed in the context of an exemplary spreadsheet application program user interface 402. In the example of FIG. 4, the interactive tooltip 400 is depicted with a mouse cursor 404 hovering over the interactive tooltip. The interactive tooltip 400 has been displayed in close proximity to the formula bar 406 because the associated function is being entered into a formula that is being edited in the formula bar 406, as opposed to the corresponding cell B4. The first argument name 408 is depicted in boldface, because the insertion cursor 410 is at the point in the formula bar 406 at which the first argument should be entered. As discussed above, in connection with FIG. 3, each argument name in an exemplary interactive tooltip will be displayed in boldface when the insertion cursor is in a position to edit the argument corresponding to the boldfaced argument name. The first argument name 408 is displayed in underline format to indicate that clicking on the first argument name 408 will select the corresponding argument in the formula bar 406 (or in the cell, when editing directly in the cell). The mouse cursor 404 can also be changed to indicate that an argument name is interactive. In this example, the mouse cursor has been changed from the conventional arrow mouse cursor to a hand cursor to indicate that the argument name can be clicked on (i.e., selected). In this embodiment, however, the display of the argument name in underline format and the changing of the mouse cursor 404 is done only for arguments that have been entered. For example, the second argument name 412 ("nper") will not become underlined, should the mouse cursor 404 hover over the second argument name, because the second argument name has not been entered.

Figure 5:
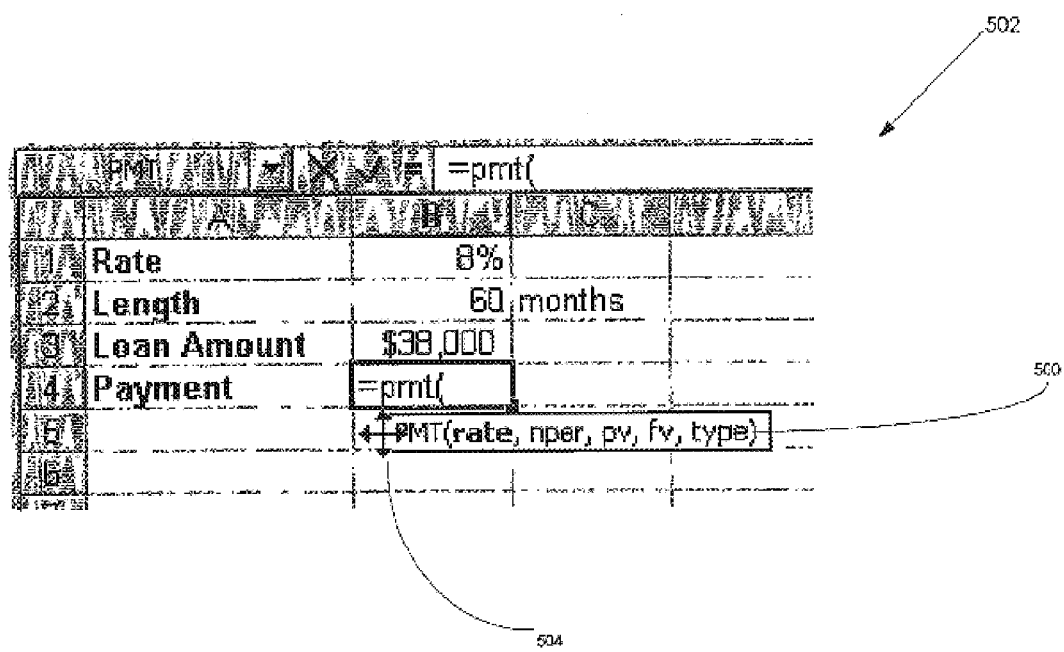
FIG. 5 depicts an exemplary interactive tooltip that can be moved in relation to an exemplary spreadsheet application program user interface.

FIG. 5 depicts an exemplary interactive tooltip displayed in the context of an exemplary spreadsheet application program user interface 502. The interactive tooltip 500 is shown with a movement cursor 504 displayed thereon. The movement cursor 504 will be displayed in connection with the interactive tooltip 500 when the mouse cursor hovers over the interactive tooltip and when the interactive tooltip can be moved. The interactive tooltip can be moved with respect to the spreadsheet application program user interface 502 by use of the mouse cursor. Clicking on and dragging the interactive tooltip 500 will move the tooltip. This can be done with the mouse cursor. When the user clicks on and drags the interactive tooltip 500, the mouse cursor is changed to the movement cursor 504 to indicate that the interactive tooltip 500 is enabled to be repositioned. The repositioned location of the interactive tooltip 500 can be stored and the interactive tooltip can be displayed in the new position the next time the interactive tooltip is displayed. Alternatively, the tooltip can be displayed in its default position (in close proximity to the edited formula) each time the interactive tooltip is displayed, without regard to any previous repositioning.

Figure 6:
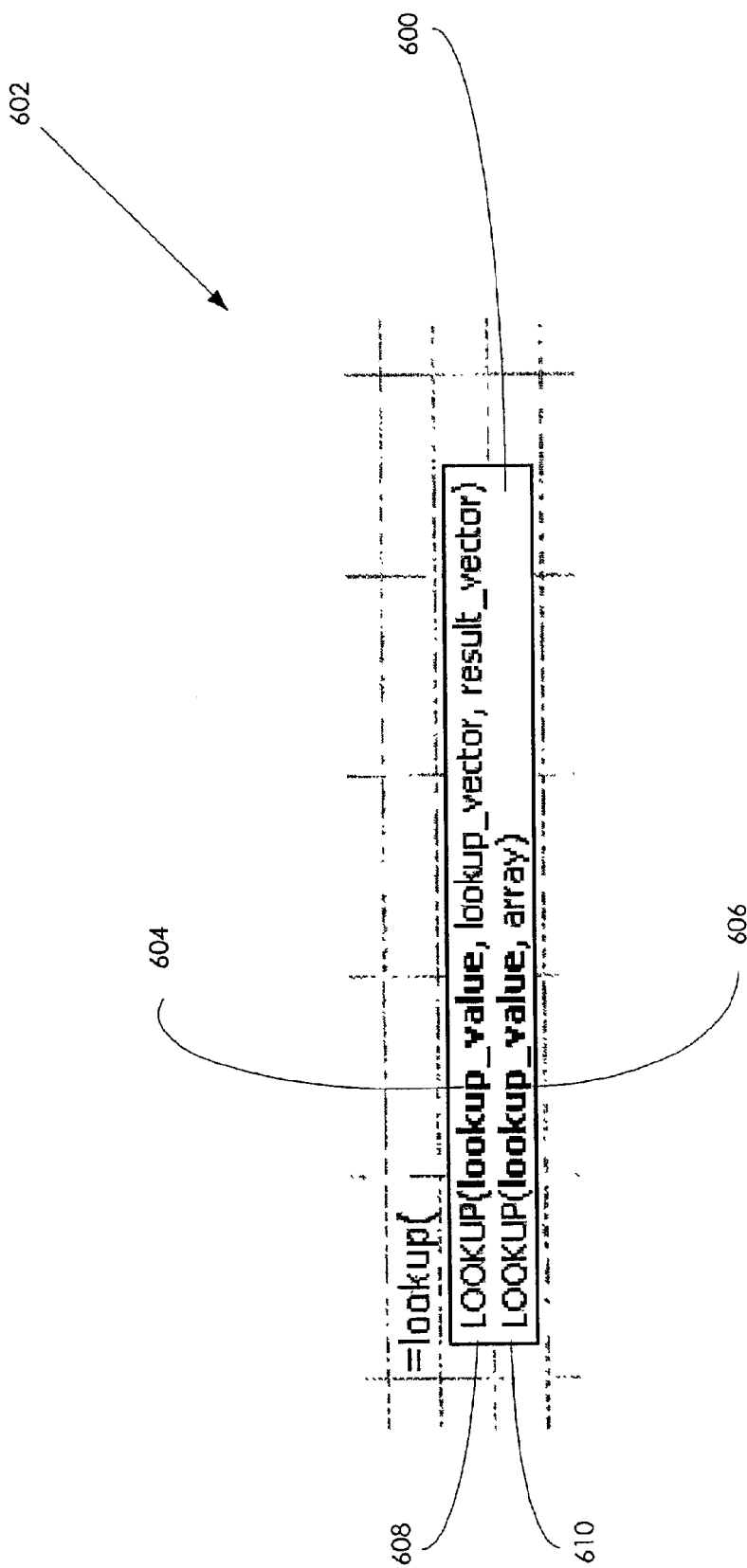
FIG. 6 depicts an exemplary multi-syntax interactive tooltip displayed in the context of an exemplary spreadsheet application program user interface.

FIG. 6 depicts an exemplary multi-syntax interactive tooltip 600 displayed in the context of an exemplary spreadsheet application program user interface 602. The interactive tooltip 600 of FIG. 6 displays two function names and argument list possibilities. This multisyntax interactive tooltip is displayed when a particular recognized function name can have more than one argument list. In the example of FIG. 6, the function has two, acceptable argument lists corresponding to the same function name ("lookup"). The first argument name 604, 606 in each tooltip entry is boldfaced, because the insertion cursor (not shown) is in a position to enter the first argument. Because the second interactive tooltip entry 610 only includes two arguments, it will be eliminated from the interactive tooltip 600 if a comma is entered following the entry of a second argument. That is, if the user indicates that a third argument is to be enterd, then the second option 610 of the interactive tooltip 600 is not applicable and will be deleted from the interactive tooltip.

Figure 7A:
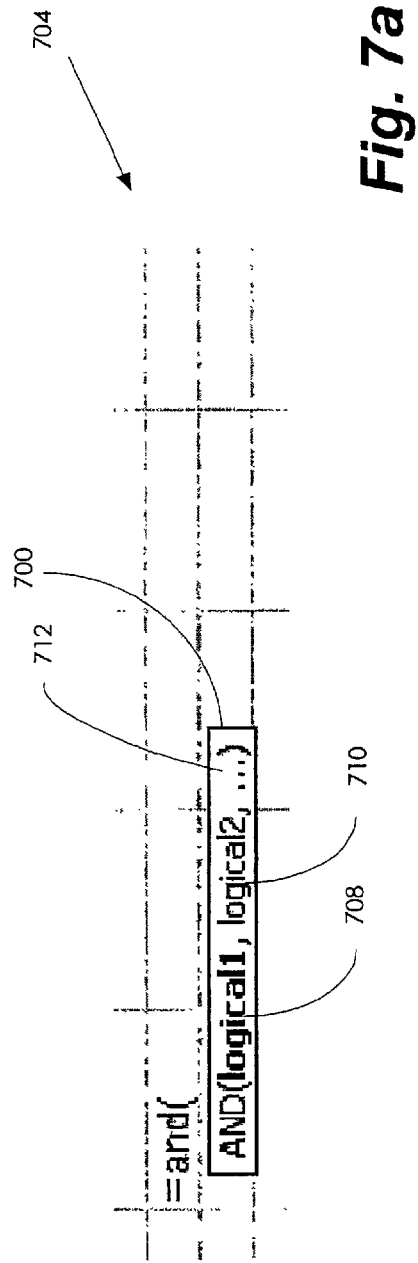
FIG. 7a depicts an exemplary interactive tooltip having an argument name that changes appearance in response to a mouse cursor position.
Figure 7B:
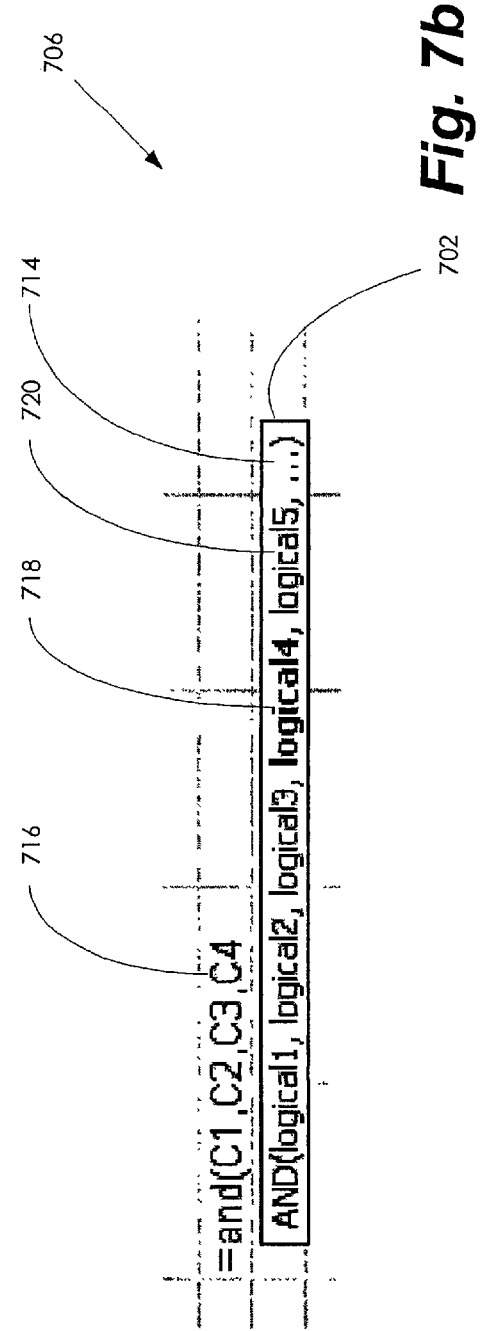
FIG. 7b depicts an exemplary interactive tooltip having an argument name that changes appearance in response to a mouse cursor position.

FIGS. 7a and 7b depict an exemplary interactive tooltip 700, 702 in the context of exemplary spreadsheet application program user interfaces 704, 706. Some functions permit a variable number of arguments. For example, the Boolean function AND will permit the entry of up to 30 arguments. In FIG. 7a, the interactive tooltip 700 includes a first argument name 708 and a second argument name 710. Because the insertion cursor (not shown) is in a position to permit the entry of the first argument, the first argument name 708 is displayed in boldface format. The second argument name 710 is depicted followed by an ellipsis 712. The ellipsis 712 indicates that other arguments can be entered.

Turning now to FIG. 7b, an interactive tooltip 702 is shown with five argument names followed by an ellipsis 714. The insertion cursor (not shown) is in a position to edit the fourth argument 716, resulting in the display of the fourth argument name 718 in boldfaced format. As with the tooltip shown in FIG. 7a, one additional argument name, the fifth argument name 720, is displayed with an ellipses 714 to indicate that more arguments can be entered into the formula.

Figure 8:
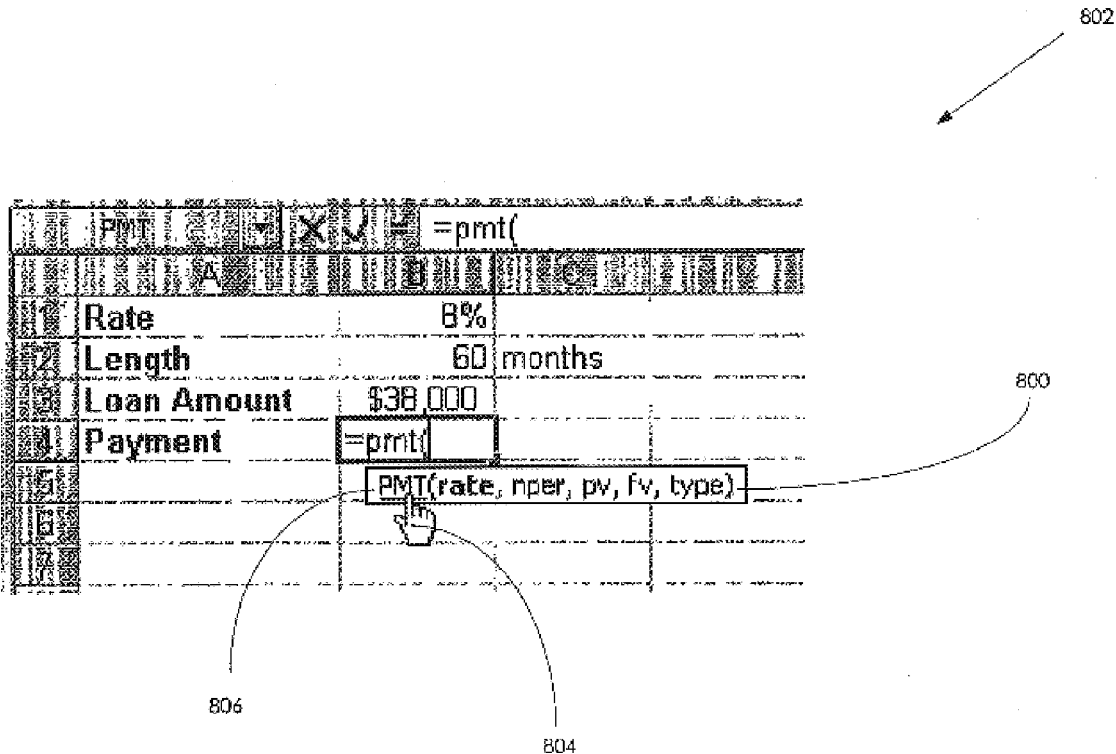
FIG. 8 depicts an exemplary interactive tooltip having a function name that changes appearance in response to a mouse cursor position.

FIG. 8 depicts an exemplary interactive tooltip 800 in the context of an exemplary spreadsheet application program user interface 802. The interactive tooltip 800 is displayed with a mouse cursor 804 hovering over the function name 806. The function name is displayed in underlined format to indicate that the function name is interactive. The function name 806 can be clicked on to access a help topic related to the function name. For example, a help topic for the payment function may include a brief description of the appropriate arguments for the payment function and may provide some information as to appropriate uses of the payment function. As discussed above, the help topic may be an external module or may be incorporated into the help facility 200 or the function database 208 of an exemplary embodiment of the present invention. Alternatively, the function name may operate as a hyperlink to an external location. For example the hyperlink may link the user to a location identified by a conventional uniform resource locator (URL).

Figure 9:
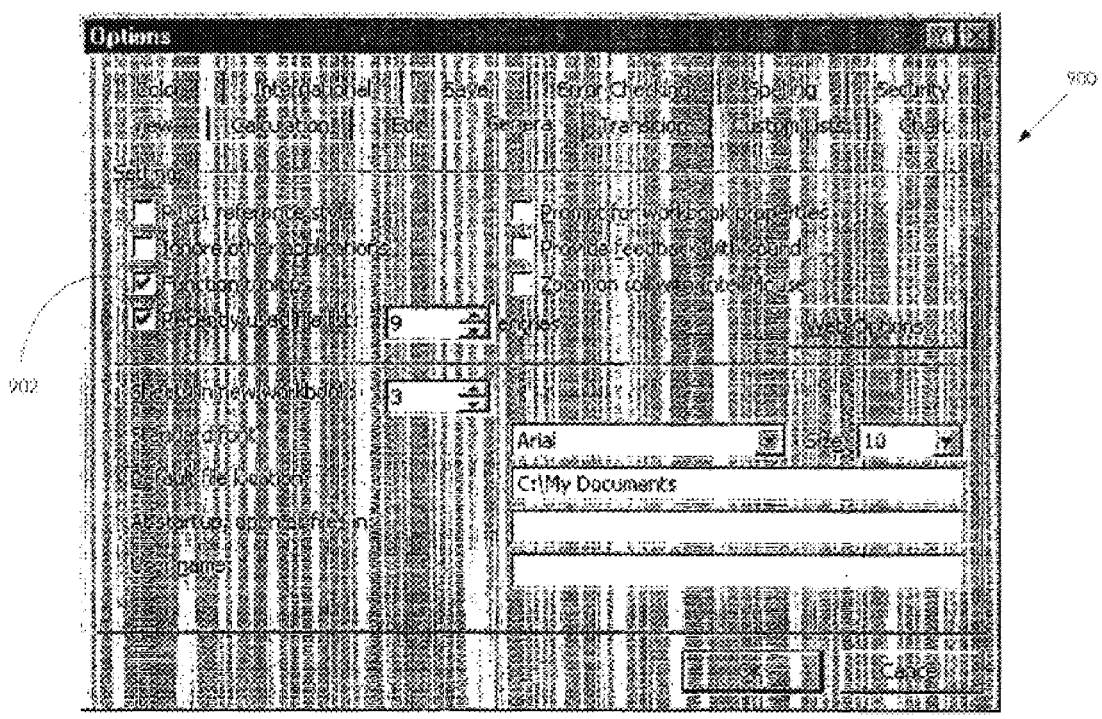
FIG. 9 depicts an exemplary options dialog box for entering preferences regarding the behavior of interactive tooltips.

FIG. 9 depicts an exemplary spreadsheet options dialog box 900 for entering preferences regarding the behavior of interactive tooltips. Check box 902 can be selected or de-selected to indicate whether interactive tooltips should be displayed in connection with the entry of function names and function arguments. If the check box 902 is selected, then the interactive tooltips will be displayed when a valid function is entered. When the check box 902 is de-selected, then the interactive tooltips will not be so displayed.

Figure 10:
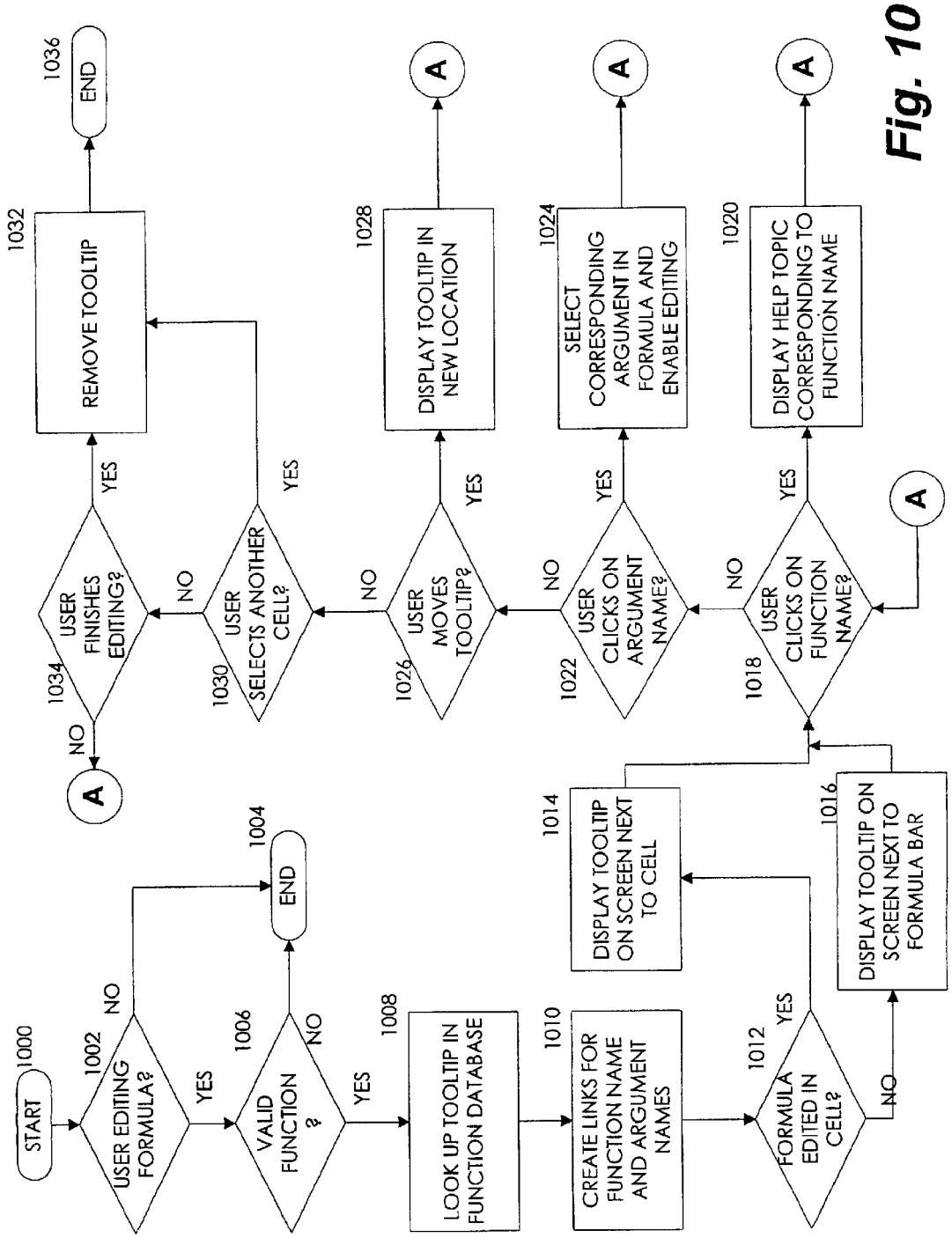
FIG. 10 is a flow chart depicting an exemplary method for displaying interactive tooltips in connection with the entry of a spreadsheet function.

FIG. 10 is a flow chart depicting an exemplary method for displaying interactive tooltips in connection with the entry of a spreadsheet function. The method begins at step 1000 and proceeds to decision block 1002. At decision block 1002, a determination is made as to whether a user is editing a formula. In an exemplary spreadsheet application program, the entry of an equals sign ("=") indicates that the user is entering a spreadsheet formula, as opposed to any other kind of data type. Of course, any other means for indicating the entry of a formula could be used. If a determination is made that the user is not editing a formula (e.g., the user is entering a numeric value), then the method branches to step 1004 and ends. If, on the other hand, a determination is made at decision block 1002 that the user is editing a formula, the method branches to decision block 1006.

At decision block 1006, a determination is made as to whether the user has entered a valid function. As described above in connection with FIG. 2, a valid function is defined as a function that corresponds to a function name in the function table 210 (FIG. 2). That is, any function name that is entered by a user is not a valid function name if it is not found in the function table 210. If a determination is made that the entered function is not a valid function, then the method branches to step 1004 and ends. If, on the other hand, a determination is made that the user has entered a valid function, then the method branches to step 1008.

At step 1008, the tooltip information is collected from the function database. That is, the function name, corresponding argument names, and the display information for each is retrieved from the function database. The method then proceeds to step 1010. At step 1010, links are created for the function name and the argument names. As discussed above, the link for the function name can enable access to a help topic corresponding to the function name and the link for the argument names can enable navigation within the function being edited. Alternatively, the link for the argument names can enable access to a help topic corresponding to the argument name. The method then proceeds to decision block 1012.

At decision block 1012, a determination is made as to whether the formula is being edited in the cell in which the formula will be stored. If the formula is being edited in the cell, then the method branches to step 1014. At step 1014, an interactive tooltip is displayed on the display next to the cell. If, on the other hand, a determination is made at decision block 1012 that the formula is not being entered in the cell (i.e., the formula is being edited in the formula bar), then the method branches to step 1016 and the tooltip is displayed on the display next to the formula bar. The method proceeds from both steps 1014 and 1016 to decision block 1018.

At decision block 1018, a determination is made as to whether the user has clicked on the function name. If the user clicks on the function name, then the method branches to step 1020 and a help topic corresponding to the function name is displayed. The method then proceeds back to decision block 1018, via connectors A.

If a determination is made at decision block 1018 that user has not clicked on the function name, then the method proceeds to decision block 1022. At decision block 1022, a determination is made as to whether the user clicks on an argument name. If the user clicks on an argument name, then the method branches to step 1024 and the argument corresponding to the argument name is selected in the formula being edited. The method then proceeds back to decision block 1018, via connectors A.

If, at decision block 1022, a determination is made that the user has not clicked on the argument name, then the method branches to decision block 1026. At decision block 1026 a determination is made as to whether the user moves the interactive tooltip on the display to a new location. If the user moves the interactive tooltip, then the method branches to step 1028. At step 1028, the interactive tooltip is displayed in the new location. The method then proceeds back to decision block 1018, via connectors A.

If a determination is made at decision block 1026 that the user has not moved the interactive tooltip, then the method branches to decision block 1030. At decision block 1030, a determination is made as to whether the user selects another cell. That is, whether the user has moved the focus to a cell other than the one in which the formula was being edited. If the user selects another cell, then the method branches to step 1032 and the interactive tooltip is removed from the display. If the user does not select another cell, then the method branches to decision block 1034. At decision block 1034, a determination is made as to whether the user has finished editing the formula. If the user has finished editing the formula, then the method branches to step 1032 and the interactive tooltip is removed from the display. The method proceeds from step 1032 to step 1036 and ends.

If a determination is made at step 1034, that the user has not finished editing the formula, then the method proceeds to decision block 1018, via connectors A.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for providing an interactive tooltip, the method comprising the steps of:

receiving an indication that a function is being entered in an editing location;

recognizing an entered function name;

retrieving tooltip information associated with the recognized function name; and displaying the tooltip information in a display location, the display location being proximate to the editing location;

wherein the tooltip information includes a function name displayed in an underlined format and an argument name, the function name providing a link to a function name help topic, the argument name providing a selection tool to select a portion of the editing location corresponding to the argument name.

2. A computer readable medium having stored thereon computer-executable instructions for performing the method of claim 1.

3. The method of claim 1, wherein the step of receiving the indication comprises recognizing the entry of an equals sign, a function name, and an open parenthesis.

4. The method of claim 1, wherein the step of recognizing the entered function name comprises comparing the entered function name to a function list and finding a matching function name in the function list.

5. The method of claim 1, wherein the editing location is a spreadsheet cell.

6. The method of claim 1, wherein the editing location is a formula bar.

7. The method of claim 1, wherein the step of displaying the tooltip information comprises displaying a currently selected argument name in a boldfaced format.

8. In a computer system having a graphical user interface including a display and a user interface selection device, a spreadsheet help facility comprising:

a function database for storing a function name text string, an argument name text string associated with the function name text string, a first link associated with the function name text string, and a second link associated with the argument name text string;

a recognizer component for recognizing the entry of the function name and for retrieving the function name, the argument name, the first link, and the second link from the function database;

a first rendering component for matching the function name text string to the first link and for matching the argument name text string to a second link; and a second rendering component for displaying a tooltip comprising the function text string and the argument text string;

wherein selecting the function text string with the user interface selection device displays a help topic identified by the first link and wherein selecting the argument text string with the user interface selection device selects a portion of the entered function name.

9. The method of claim 8, wherein the recognizer component recognizes the entry of the function name by recognizing the entry of an equals sign, the function name, and an open parenthesis and by comparing the function name to a function list in the function database and finding a matching function name in the function list.

10. The method of claim 8, wherein the tooltip is displayed in proximity to a selected spreadsheet cell.

11. The method of claim 8, wherein the tooltip is displayed in proximity to a formula bar.

* * * * *